(12) United States Patent
Levine et al.

(10) Patent No.: US 12,391,105 B1
(45) Date of Patent: Aug. 19, 2025

(54) TRI-AXIAL FLUX MOTORS WITH IN-WHEEL REDUCERS

(71) Applicant: FCA US LLC, Auburn Hills, MI (US)

(72) Inventors: Mark Levine, Auburn Hills, MI (US); Pradeep Attibele, Auburn Hills, MI (US); Brian L Spohn, Auburn Hills, MI (US); Lucien Duplessis, Auburn Hills, MI (US); Tejinder Singh, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/828,610

(22) Filed: Sep. 9, 2024

(51) Int. Cl.
*B60K 17/16* (2006.01)
*B60K 1/02* (2006.01)
*B60K 7/00* (2006.01)
*B60K 17/04* (2006.01)
*F16H 37/08* (2006.01)
*F16H 48/36* (2012.01)

(52) U.S. Cl.
CPC ............ *B60K 1/02* (2013.01); *B60K 7/0007* (2013.01); *B60K 17/043* (2013.01); *B60K 17/165* (2013.01); *F16H 37/0806* (2013.01); *F16H 48/36* (2013.01); *F16H 2048/364* (2013.01)

(58) Field of Classification Search
CPC ...... B60K 1/02; B60K 7/0007; B60K 17/043; B60K 17/165; F16H 37/0806; F16H 48/36; F16H 2048/364
See application file for complete search history.

(56) References Cited

U.S. PATENT DOCUMENTS 9,067,484 B2 * 6/2015 Zhao .................... B60K 1/00
2022/0289011 A1 * 9/2022 Daniel .................. B60K 17/02

FOREIGN PATENT DOCUMENTS

DE 102022003151 B3 * 2/2024 ............... B60K 1/02
WO WO-2023126237 A1 * 7/2023 ............... B60K 1/00

* cited by examiner

*Primary Examiner* — Justin Holmes
(74) *Attorney, Agent, or Firm* — Jeremy J. Klobucar

(57) ABSTRACT

An electric drive system for an electrified vehicle includes a driveline, a first axial flux motor, a second axial flux motor, a third axial flux motor and a differential. The third axial flux motor is disposed between the first and second axial flux motors. The third axial flux motor has a first output shaft that provides a first torque input to the first motor and a second output shaft that provides a second torque input to the second motor. The differential is disposed in the third axial flux motor. The differential provides selective speed differentiation between the first and second output shafts. Wheel reducers are arranged in drive wheels of the driveline. The wheel reducers can be exchanged based on vehicle application.

17 Claims, 3 Drawing Sheets

TRI-AXIAL FLUX MOTORS WITH IN-WHEEL REDUCERS

FIELD

The present application relates generally to electric drive systems for electric vehicles and, more particularly, to an axially arranged three motor configuration for an electrified vehicle.

BACKGROUND

An electrified vehicle (hybrid electric, plug-in hybrid electric, range-extended electric, battery electric, etc.) includes at least one battery system and at least one electric motor. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) converter.

Electric vehicles can have electric motors configured in various arrangements. Some electric vehicles have a single electric motor dedicated to a drive axle. All-wheel-drive electric vehicles can have multiple electric motors such as one or more dedicated to a front and/or rear drive axle. Some arrangements include a dedicated electric motor for each drive wheel. Regardless of the arrangement, it can be desirable to provide a configuration that offers suitable drive torque depending upon vehicle type. In doing so, it can be challenging to configure an electrified powertrain for high torque and high power electric motors as the packaging requirements can be a limiting factor. Moreover, existing configurations do not allow for modularity when more than one configuration may be desired for the same vehicle type. Accordingly, while such electrified powertrains work well for their intended purpose, there is a desire for improvement in the relevant art.

SUMMARY

In accordance with one example aspect of the invention, an electric drive system for an electrified vehicle includes a driveline, a first axial flux motor, a second axial flux motor, a third axial flux motor and a differential. The third axial flux motor is positioned between the first and second axial flux motors. The third axial flux motor has a first output shaft that provides a first torque input to the first motor and a second output shaft that provides a second torque input to the second motor. The differential is disposed in the third axial flux motor. The differential provides selective speed differentiation between the first and second output shafts.

In examples, the electric drive system further includes a first wheel reducer arranged at the first drive wheel; and a second wheel reducer arranged at the second drive wheel.

In addition to the foregoing, the first and second wheel reducers provide a predetermined gear ratio associated with a vehicle type of the electrified vehicle.

In addition to the foregoing, the differential comprises a first side gear that drives the first output shaft, a second side gear that drives the second output shaft and a plurality of planet gears that are meshed for rotation with the first and second side gears.

In addition to the foregoing, the first, second and third axial flux motors are axially arranged on a rear axle of the electrified vehicle.

In examples, the first, second and third axial flux motors are axially arranged on a front axle of the electrified vehicle.

In accordance with one example aspect of the invention, the first axial flux motor drives the first drive shaft and the second axial flux motor drives the second drive shaft, the first and second axial flux motors providing torque vectoring between the first and second drive wheels.

In examples, the third axial motor adds drive torque to the driveline without compromising the torque vectoring.

In accordance with one example aspect of the invention, an electric drive system for an electrified vehicle includes a driveline and a drive module system. The driveline includes a first drive shaft that drives a first drive wheel and a second drive shaft that drives a second drive wheel. The drive module system is selectively configurable in both of: a first configuration and having a first axial flux motor, a second axial flux motor, and a third axial flux motor disposed between the first and second axial flux motors, the third axial flux motor having a first output shaft that provides a first torque input to the first motor and a second output shaft that provides a second torque input to the second motor; and a second configuration and having a first axial flux motor, and a second axial flux motor, wherein the first axial flux motor drives the first drive shaft and the second axial flux motor drives the second drive shaft, the first and second axial flux motors providing torque vectoring between the first and second drive wheels.

In other features, the electric drive system includes a differential disposed in the third axial flux motor, the differential providing selective speed differentiation between the first and second output shafts.

In other examples, the electric drive system includes a first wheel reducer arranged at the first drive wheel; and a second wheel reducer arranged at the second drive wheel.

In other implementations, the first and second wheel reducers provide a predetermined gear ratio associated with a vehicle type of the electrified vehicle.

In examples, the differential comprises a first side gear that drives the first output shaft, a second side gear that drives the second output shaft and a plurality of planet gears that are meshed for rotation with the first and second side gears.

In additional implementations, the first, second and third axial flux motors are axially arranged on a rear axle of the electrified vehicle in the first configuration.

In other examples, in the first and second configurations, the first axial flux motor drives the first drive shaft and the second axial flux motor drives the second drive shaft, the first and second axial flux motors providing torque vectoring between the first and second drive wheels.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As noted above, it can be desirable to provide an electric motor configuration that offers suitable drive torque depending upon vehicle type. In doing so, it can be challenging to configure an electrified powertrain for high torque and high power electric motors as the packaging requirements can be a limiting factor. Moreover, existing configurations do not allow for modularity when more than one configuration may be desired for the same vehicle type.

The present disclosure provides a modular electric drive system than incorporates a drive module having axial flux motors arranged in series. In a first configuration, three axial flux motors are arranged axially in series. As axial flux motors take up significantly less space (axially), three motors are arranged axially side-by-side and can collectively fit between the rails of most allowable packaging spaces. The center motor of the three axial motors includes an internal differential. The three axial motor configuration can be particularly suitable in high performance vehicles. The three axial motor configuration can be incorporated at the rear axle and/or the front axle and would include controls that optimize the torque and power as well as efficiency for a given accelerator pedal request. The electric drive system further provides a wheel reducer system having in-wheel reducers that can be changed and/or customized to meet specific vehicle needs to satisfy low speed torque or top end speed. The drive module can also be adapted in a second configuration where the center motor is removed leaving two axial flux motors arranged in series.

Figure 1:
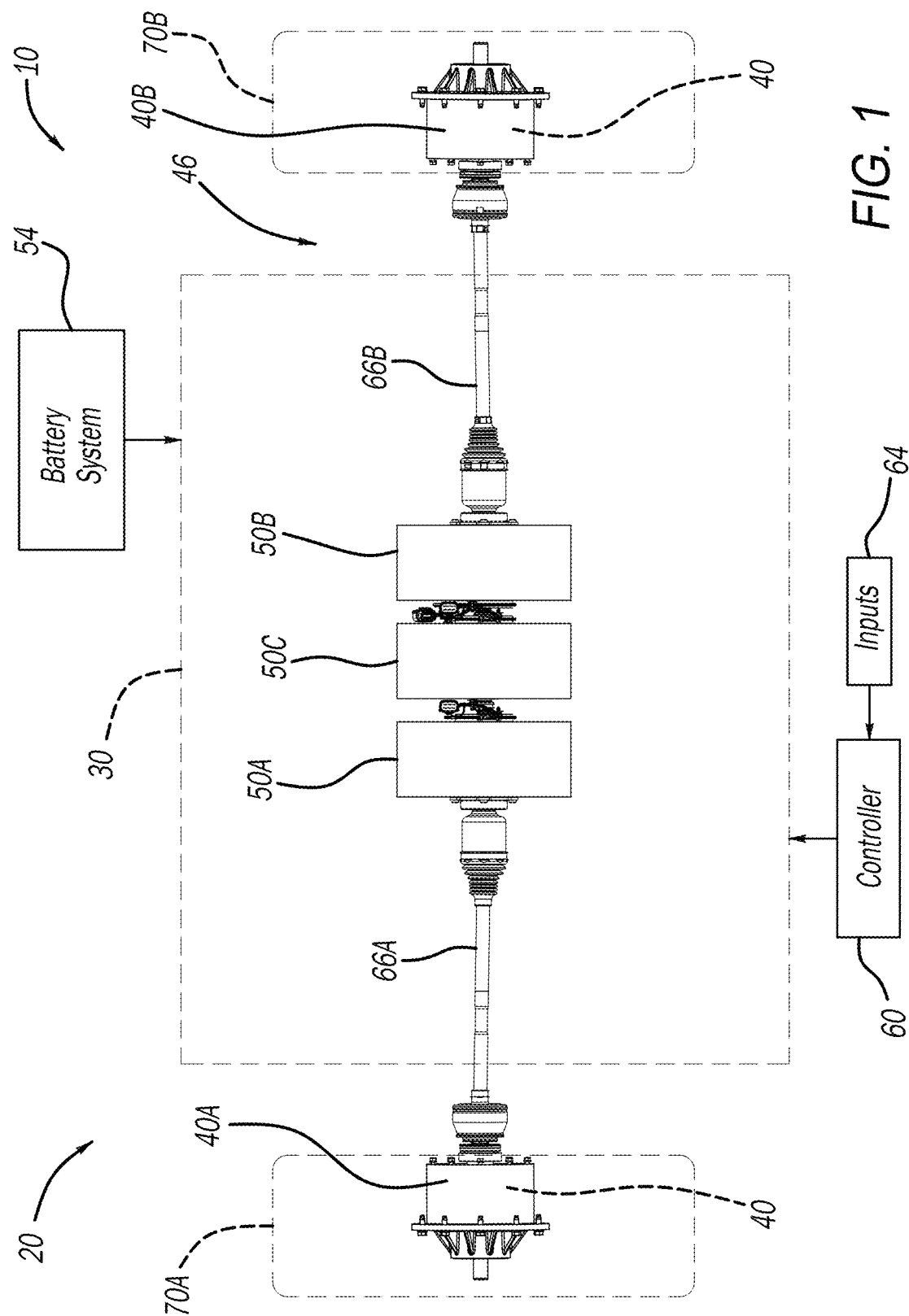
FIG. 1 is a schematic illustration of an example electric drive system including a drive module system and a wheel reducer system, the drive module system shown having first, second and third (center) axially arranged flux motors in accordance with the principles of the present application.

With initial reference to FIG. 1, a vehicle 10 is partially shown in accordance with the principles of the present disclosure. In the example embodiment, vehicle 10 includes an electric drive system 20 having a drive module system 30 and a wheel reducer system, collectively identified at reference numeral 40. The drive module system 30 is configured to generate and transfer drive torque to a driveline 46 for vehicle propulsion.

The drive module system 30 is shown in a first configuration having a first electric drive motor 50A, a second electric drive motor 50B and a third electric drive motor 50C. In the first configuration, the first and second drive motors 50A and 50B are arranged on opposing axial sides of the third, or center, drive motor 50C. The electric motors 50A-50C are connectable via a power inverter module (not specifically shown) to a high voltage battery system 54. A controller 60 can communicate signals to the drive module system 30 indicative of a torque request based on inputs 64 (e.g., such as from an accelerator pedal). While the electric motors 50A-50C are described herein as axial flux motors, it will be appreciated that other motor configurations such as, but not limited to, radial flux motors may be used.

The exemplary driveline 46 includes a first drive shaft 66A, a second drive shaft 66B, the wheel reducer system 40 and drive wheels 70A and 70B. The wheel reducer system 40 includes a first wheel reducer 40A arranged at the first drive wheel 70A and a second wheel reducer 40B arranged at the second drive wheel 70B. The first and second wheel reducers 40A and 40B allow the respective shafts 60A and 60B to be minimally sized since the final increase in torque will be accomplished by the wheel reducers 40A and 40B in the wheels 70A and 70B, respectively.

In the examples shown, the wheel reducers can provide predetermined gear ratios selected for various vehicle types. For example, but not limited to, gear ratios of 3:1, 6:1 and others may be used. The gear ratios can be achieved with any gearing arrangement such as, but not limited to planetary gear sets. As will become appreciated herein, the wheel reducers 40A, 40B can be swapped out for other wheel reducers having different gear ratios that may be particularly suited for a particular vehicle application. Furthermore, the wheel reducers 40A, 40B can be swapped out based on whether the axial motor configuration is in the first configuration (three side-by-side), or in a second configuration (center motor removed).

Figure 2:
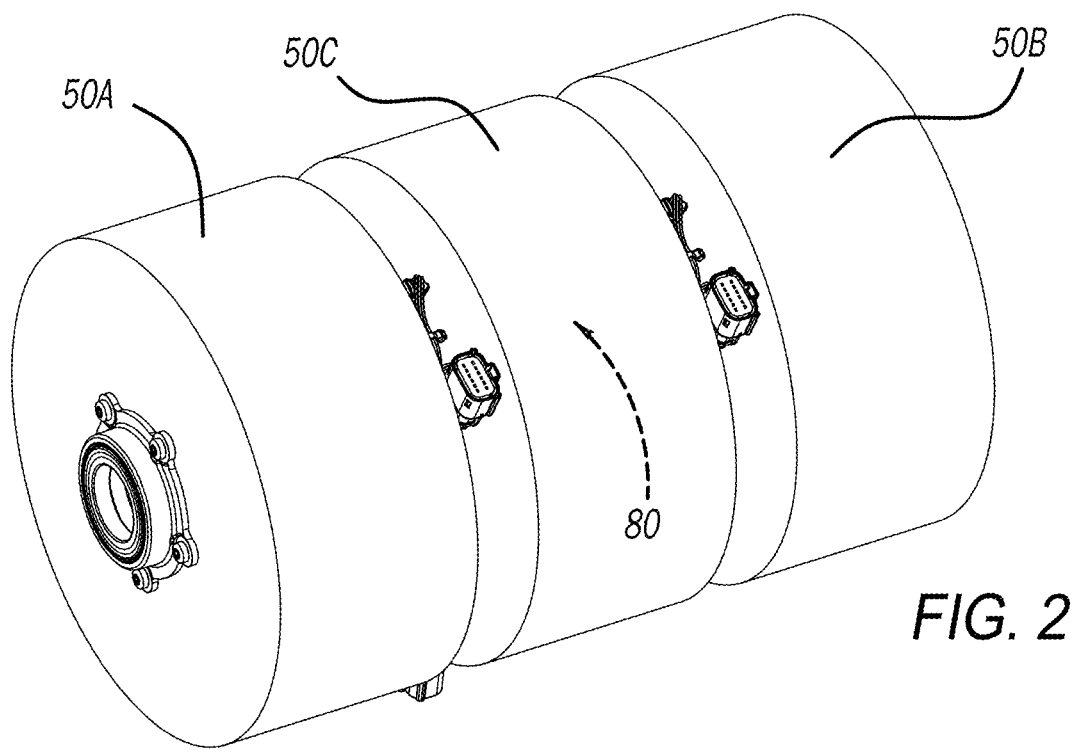
FIG. 2 is a front perspective view of the drive module system shown in FIG. 1, shown in a first configuration with all of the first, second and third flux motors operably coupled, in accordance with the principles of the present application.
Figure 3:
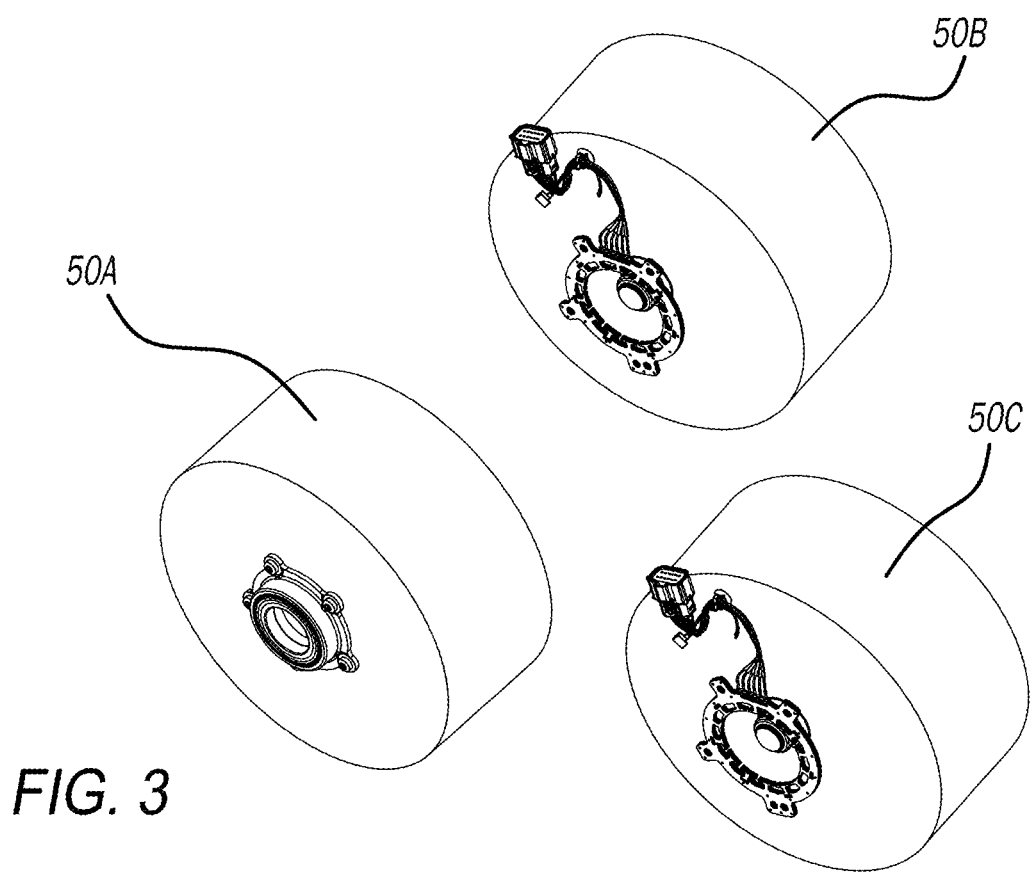
FIG. 3 is a front perspective view of the drive module system shown in FIG. 1, shown in a second configuration with the center flux motor removed, in accordance with the principles of the present application.
Figure 4:
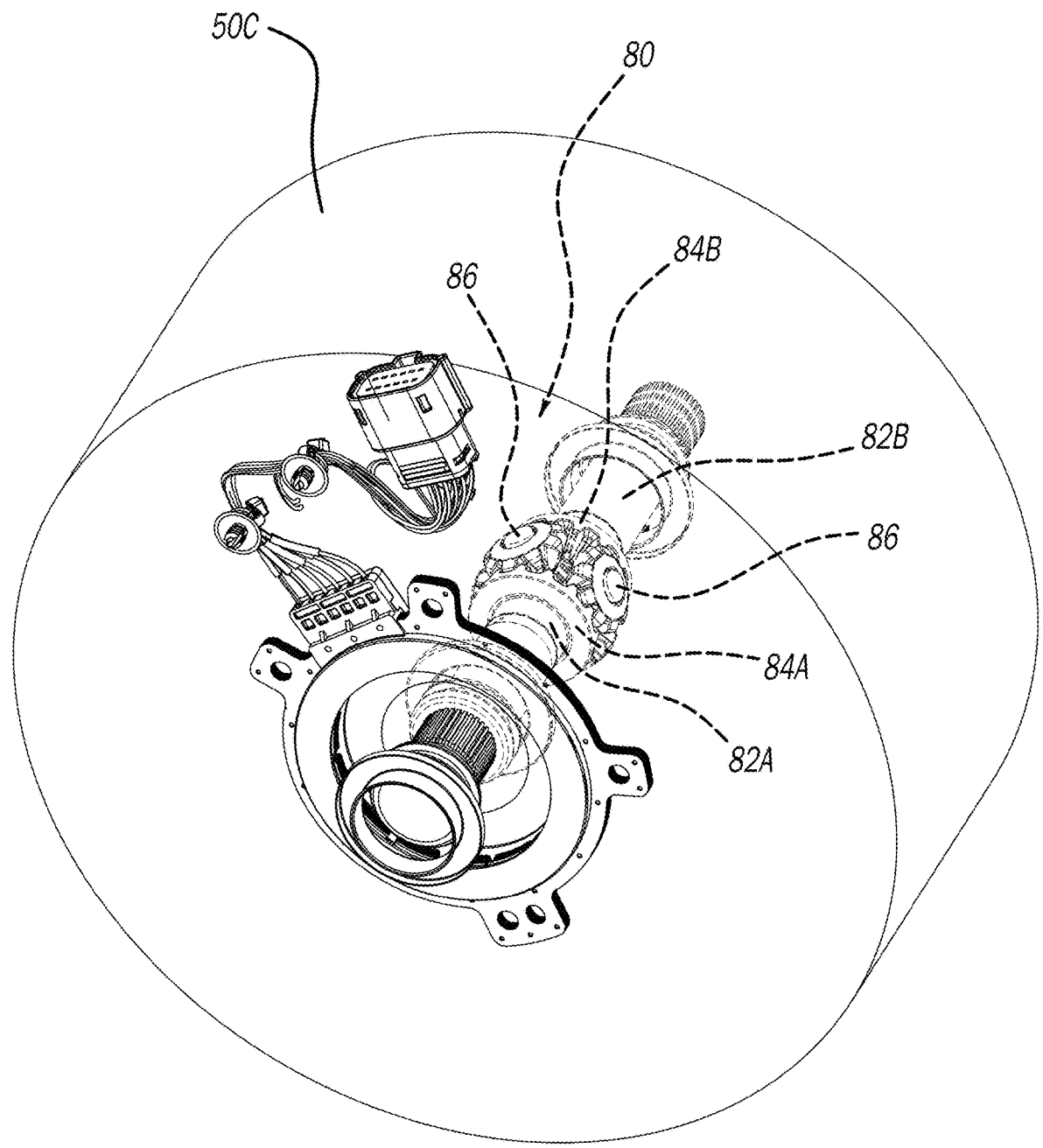
FIG. 4 is a perspective detail view of the center flux motor illustrating an internal differential, in accordance with the principles of the present application.

With continued reference to FIG. 1 and additional reference to FIGS. 2 and 3, additional features of the instant disclosure will be described. FIG. 2 is a front perspective view of the drive module system shown in FIG. 1, shown in a first configuration with all of the first, second and third flux motors 50A, 50B and 50C operably coupled. FIG. 3 is a front perspective view of the drive module system shown in FIG. 1, shown in a second configuration with the center flux motor 50C removed. Having two outboard axial flux motors 50A, 50B going directly to each wheel 70A, 70B allows for torque vectoring while the third center motor 50C adds torque and power to the system without compromising the torque vectoring capabilities.

The electric drive system 20 is modular and easily adaptable to configure dependent upon vehicle type. In this regard it is contemplated that an electric drive system 20 can be used in multiple configurations such as a first configuration (FIG. 2) in a high performance vehicle (such as using all three coaxial motors and appropriately geared wheel reducers), or in a second configuration (FIG. 3) in a lower power application, such as by using only the two motors 50A and 50B without the center motor 50C and appropriately geared wheel reducers.

As mentioned herein, the electric drive system 20 can be configured on either a front or rear drive axle of the driveline. In some configurations, the electric drive system 20 can be arranged on both the front and rear drive axles for a four-wheel drive or all-wheel drive driveline vehicle.

The center motor 50C includes a differential 80 that provides speed differentiation between a first output shaft 82A and a second output shaft 82B. In the example shown, the first output shaft 82A can provide a torque input to the motor 50A. Similarly, the second output shaft 82B can provide a torque input to the motor 50B. While the differential 80 can be arranged in any manner, the exemplary differential 80 generally includes a first side gear 84A that drives the first output shaft 82A, a second side gear 84B that drives the second output shaft 82B, and a collection of planet gears 86 that mesh with both of the side gears 84A and 84B. The differential 80 splits torque evenly to the first and second output shafts 82A, 82B, assuming no tire slip, while allowing speed differentiation during turning. The differential 80 can be relatively small in size since it is only accommodating the torque of the center motor 50C.

As described above, the electric motors 50A, 50B and 500 are axial flux motors. Axial flux motors can be larger in diameter but significantly less wide (axially) while achieving the torque and power of a radial flux motor (which is the architecture used in most electric vehicles). The in-wheels reducers 40A, 40B significantly reduce the packaging space required for the electric motors as all the gearing is performed in the wheels, rather than the motor housing. This advantage allows end users to target specific performance needs based on their individual requirements. For example, high performance vehicle drivers may want to modify their vehicles for many purposes, such as, but not limited to, drag racing, track racing, daily driving, economy driving etc.

Similarly, off-road vehicle drivers can have various off-road gearsets based on vehicle weight as well as ratios for daily travel. In examples, a user may install an economy gearset wheel reducer system 40 to get to the trail and subsequently change the wheel reducer system to increase the torque available for off-roading. This availability eliminates the need for a two speed gearbox. An off-road gearset would only "need" to be purchased if desired by the user. This eliminates being limited to the one or two speed gearbox selection at the time of original vehicle purchase for the life of the vehicle. The drive module system 30 allows for future electric motor designs that may have significantly more power and torque.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electric drive system for an electrified vehicle, the electric drive system comprising:
   a driveline including a first drive shaft that drives a first drive wheel and a second drive shaft that drives a second drive wheel;
   a first axial flux motor;
   a second axial flux motor;
   a third axial flux motor positioned between the first and second axial flux motors, the third axial flux motor having a first output shaft that provides a first torque input to the first motor and a second output shaft that provides a second torque input to the second motor;
   a differential disposed in the third axial flux motor, the differential providing selective speed differentiation between the first and second output shafts;
   a first wheel reducer arranged outside of the first, second and third axial flux motors and at the first drive wheel; and
   a second wheel reducer arranged outside of the first, second and third axial flux motors and at the second drive wheel.

2. The electric drive system of claim 1, wherein the first and second wheel reducers provide a predetermined gear ratio associated with a vehicle type of the electrified vehicle.

3. The electric drive system of claim 1, wherein the differential comprises a first side gear that drives the first output shaft, a second side gear that drives the second output shaft and a plurality of planet gears that are meshed for rotation with the first and second side gears.

4. The electric drive system of claim 1, wherein the first, second and third axial flux motors are axially arranged on a rear axle of the electrified vehicle.

5. The electric drive system of claim 1, wherein the first, second and third axial flux motors are axially arranged on a front axle of the electrified vehicle.

6. The electric drive system of claim 1, wherein the first axial flux motor drives the first drive shaft and the second axial flux motor drives the second drive shaft, the first and second axial flux motors providing torque vectoring between the first and second drive wheels.

7. The electric drive system of claim 6, wherein the third axial motor adds drive torque to the driveline without compromising the torque vectoring.

8. The electric drive system of claim 1, wherein the first wheel reducer is arranged within the first drive wheel; and the second wheel reducer is arranged within the second drive wheel.

9. The electric drive system of claim 8, wherein (i) the first axial flux motor drives the first drive shaft that in turn drives the first wheel reducer; and (ii) the second axial flux motor drives the second drive shaft that in turn drives the second wheel reducer.

10. An electric drive system for an electrified vehicle, the electric drive system comprising:
    a driveline including a first drive shaft that drives a first drive wheel and a second drive shaft that drives a second drive wheel;
    a wheel reducer system comprising:
      a first wheel reducer arranged within the first drive wheel; and
      a second wheel reducer arranged within the second drive wheel
    a drive module system selectively configurable in both of:
    a first configuration and having a first axial flux motor, a second axial flux motor, and a third axial flux motor disposed between the first and second axial flux motors, the third axial flux motor having a first output shaft that provides a first torque input to the first motor and a second output shaft that provides a second torque input to the second motor; and
    a second configuration and having a first axial flux motor, and a second axial flux motor, wherein the first axial flux motor drives the first drive shaft and the second axial flux motor drives the second drive shaft, the first and second axial flux motors providing torque vectoring between the first and second drive wheels.

11. The electric drive system of claim 10, further comprising a differential disposed in the third axial flux motor, the differential providing selective speed differentiation between the first and second output shafts.

12. The electric drive system of claim 11, wherein the differential comprises a first side gear that drives the first output shaft, a second side gear that drives the second output shaft and a plurality of planet gears that are meshed for rotation with the first and second side gears.

13. The electric drive system of claim 10, wherein the first and second wheel reducers provide a predetermined gear ratio associated with a vehicle type of the electrified vehicle.

14. The electric drive system of claim 10, wherein the first, second and third axial flux motors are axially arranged on a rear axle of the electrified vehicle in the first configuration.

15. The electric drive system of claim 10, wherein in the first and second configurations, the first axial flux motor drives the first drive shaft and the second axial flux motor drives the second drive shaft, the first and second axial flux motors providing torque vectoring between the first and second drive wheels.

16. The electric drive system of claim 10, wherein the first axial flux motor is supported in a motor housing and wherein the first and second wheel reducers are arranged outside of motor housing of the drive module system.

17. The electric drive system of claim 16, wherein (i) the first axial flux motor drives the first drive shaft that in turn drives the first wheel reducer; and (ii) the second axial flux motor drives the second drive shaft that in turn drives the second wheel reducer.

* * * * *